United States Patent
De Vos et al.

(10) Patent No.: US 12,186,739 B2
(45) Date of Patent: Jan. 7, 2025

(54) REDOX PREPARATION PROCESS OF AN OXYGEN CARRIER FOR A CHEMICAL LOOPING PROCESS

(71) Applicant: VITO NV, Mol (BE)

(72) Inventors: Yoran De Vos, Mol (BE); Marijke Jacobs, Mol (BE); An Verberckmoes, Ghent (BE); Pascal Van Der Voort, Ghent (BE); Isabel Van Driessche, Ghent (BE)

(73) Assignee: VITO NV, Mol (BE)

( * ) Notice: Subject to any disclaimer, the term of this patent is extended or adjusted under 35 U.S.C. 154(b) by 648 days.

(21) Appl. No.: 17/602,457

(22) PCT Filed: Apr. 8, 2020

(86) PCT No.: PCT/EP2020/060102
§ 371 (c)(1),
(2) Date: Oct. 8, 2021

(87) PCT Pub. No.: WO2020/208115
PCT Pub. Date: Oct. 15, 2020

(65) Prior Publication Data
US 2022/0212174 A1 Jul. 7, 2022

(30) Foreign Application Priority Data
Apr. 9, 2019 (EP) .................... 19168110

(51) Int. Cl.
*B01J 23/745* (2006.01)
*B01J 37/18* (2006.01)
*B01J 38/06* (2006.01)
*C01B 3/36* (2006.01)

(52) U.S. Cl.
CPC ............. *B01J 23/745* (2013.01); *B01J 37/18* (2013.01); *B01J 38/06* (2013.01); *C01B 3/36* (2013.01); *C01B 2203/025* (2013.01)

(58) Field of Classification Search
CPC .... B01J 23/745; B01J 23/755; B01J 23/8892; B01J 23/74; B01J 23/89; B01J 37/18; B01J 38/06; C01B 3/36; C01B 2203/025
(Continued)

(56) References Cited

U.S. PATENT DOCUMENTS 9,797,594 B1 10/2017 Siriwardane et al.
2016/0023190 A1* 1/2016 Fan .................. B01J 37/12
502/328

(Continued)

FOREIGN PATENT DOCUMENTS

WO 2014/155116 A1 10/2014
WO 2018/115344 A1 6/2018

OTHER PUBLICATIONS

International Search Report for PCT Application No. PCT/EP2020/060102 mailed Jun. 5, 2020 (4 pages).
(Continued)

*Primary Examiner* — Patricia L. Hailey
(74) *Attorney, Agent, or Firm* — Merchant & Gould P.C.

(57) ABSTRACT

A process prepares an oxygen carrier for a chemical looping process including providing a material A having a first transition metal and/or an oxide of the first transition metal. The first transition metal is selected from chemical element groups 6-11 of the Periodic System. Material A is subjected to a reaction with H2 to reduce the first transition metal and/or oxide to form a reduced material B. Material B is treated with a salt solution of a second transition metal selected to have a standard reduction potential larger than the first transition metal. A portion of the first transition metal in the reduced material B is replaced by the second transition metal. A molar ratio of the first transition metal with respect to the second transition metal in material B (Continued)

ranges between 2:1 and 100:1. An oxygen carrier is obtained with the method and is regenerated using steam.

19 Claims, 8 Drawing Sheets

(58) Field of Classification Search
USPC .......................... 502/55, 300, 324, 325, 331
See application file for complete search history.

(56) References Cited

U.S. PATENT DOCUMENTS

2016/0332151 A1* 11/2016 Li .......................... B01J 23/005
2017/0370573 A1    12/2017 Fan et al.

OTHER PUBLICATIONS

Written Opinion for PCT Application No. PCT/EP2020/060102 mailed Jun. 5, 2020 (7 pages).

Chiron et al., "Kinetics of Mixed Copper-Iron Based Oxygen Carriers for Hydrogen Production by Chemical Looping Water Splitting," International Journal of Hydrogen Energy, 2012, 37:10526-10538.

Nagouda et al., "High Purity Syngas and Hydrogen Coproduction Using Copper-Iron Oxygen Carriers in Chemical Looping Reforming Process," Applied Energy, 2019, 235:1415-1426.

* cited by examiner

REDOX PREPARATION PROCESS OF AN OXYGEN CARRIER FOR A CHEMICAL LOOPING PROCESS

This application is a National Stage Application of PCT/EP2020/060102, filed 8 Apr. 2020, which claims benefit of Ser. No. 19/168,110.5, filed 9 Apr. 2019 in Europe, and which applications are incorporated herein by reference. To the extent appropriate, a claim of priority is made to each of the above disclosed applications.

TECHNICAL FIELD

The present invention is directed to a process for the preparation of an oxygen carrier for a chemical looping process.

BACKGROUND ART

Carbon dioxide emissions resulting from combustion and other chemical processes gravely impact the environment. Therefore, alternative processes have been developed in which these $CO_2$-emissions can be largely reduced. Among current and emerging technologies for $CO_2$ capture, chemical looping processes were frequently mentioned as a particularly promising approach to combining $CO_2$-capture and energy production.

Commonly, Chemical Looping is used to denote cyclic processes that use a solid material which circulates the oxygen required for the conversion of a fuel. This solid material is hence called 'Oxygen Carrier' and consists traditionally of metal oxide particles. To close the chemical loop, the oxygen depleted solid oxygen carrier must be re-oxidized (regenerated) before starting a new cycle. Depending on the focus of the chemical looping process, the oxygen carrier material can be regenerated using air, or even $H_2O$ or $CO_2$.

When the goal of the process is energy production, the fuel is converted to total oxidation products ($CO_2$ and $H_2O$) and the oxygen depleted solid is regenerated air as oxygen source. The process is then known as Chemical Looping Combustion (CLC). In important advantage of CLC is the inherent separation of $N_2$ contained in the oxidizing air and the $CO_2$ produced in the process. $H_2O$ still present in the flue gas can easily be condensed and a pure $CO_2$-stream may be obtained without additional separation costs. There is also no need for an expensive air separation unit such as used in conventional oxy-fuel combustion.

More recently, however, the focus of chemical looping is shifting more towards the production of hydrogen and other chemicals instead of energy. This way, products with more economic added value can be generated, which increase the economic viability of the technology in the current context, even at smaller scales.

Chemical looping reforming (CLR) and Chemical Looping Gasification (CLG) involve the use of gaseous carbonaceous feedstock (natural gas) and solid carbonaceous feedstock (coal and biomass), respectively, in their conversion to syngas ($CO+H_2$). The feedstocks are partially oxidized to generate syngas using metal oxide oxygen carriers as the oxidant. The reduced metal oxide is then oxidized in the regeneration step using air.

An important motivation for developing the CLR and CLG processes lies in the advantage that they permit avoiding the use of pure oxygen as an oxidant in the reaction, since steam and carbon dioxide can be used as the oxidants. Besides this, the metal oxide may serve as the heat transfer medium in the chemical looping process. CLR and CLG are promising concepts for $H_2$ production with integrated $CO_2$-separation. The reactor concept, which conventionally utilizes two interconnected fluidized-bed systems, is similar for conventional chemical looping combustion. The difference is that the aim of the process is now production of $H_2$ and CO instead of heat. This is achieved by keeping the air to fuel ratio in the total system low to prevent the fuel from being fully oxidized to $CO_2$ and $H_2O$. To achieve a pure hydrogen stream, this reformer gas is converted in a water gas shift reactor to maximize $H_2$-yield, and $H_2$ can be separated from $CO_2$ by pressure swing adsorption or absorption in suitable solvents.

Oxygen carriers that are used in these CLC and CLR processes are described in the art.

Francois-Xavier Chiron, Gregory S. Patience disclose in Kinetics of mixed copper-iron based oxygen carriers for hydrogen production by chemical looping water splitting, Int. J. of Hydrogen Energy 37 (2012) 10526-1053 that oxygen carriers for water splitting may be produced by incipient wetness impregnation by deposition of iron nitrate $Fe(NO_3)_3 \cdot 9H_2O$ and copper nitrate $Cu(NO_3)_2 \cdot 2H_2O$ aqueous solutions on dried alumina. For co-precipitation, $Fe(NO_3)_3 \cdot 9H_2O$ and copper nitrate $Cu(NO_3)_2 \cdot 2H_2O$ aqueous solutions were mixed with aluminum nitrate $Al(NO_3)_3 \cdot 9H_2O$. The solid materials thus obtained were dried and calcined and then used in water decomposition. Copper based particles had a tendency to agglomerate.

U.S. Pat. No. 9,797,594 discloses a tri-metallic ferrite oxygen carrier for the chemical looping combustion of carbonaceous fuels. The tri-metallic ferrite oxygen carrier comprises $Cu_xFe_yMn_zO_{4-\delta}$ wherein $0.5 \le x \le 2.0$, $0.2 \le y \le 2.5$, and $0.2 \le z \le 2.5$. The $Cu_xFe_yMn_zO_{4-\delta}$ may be carried on an inert support material. The tri-metallic ferrite oxygen carrier may be utilized for the combustion of a solid carbonaceous fuel by delivering the tri-metallic ferrite oxygen carrier to a fuel reactor and mixing the carbonaceous fuel and the tri-metallic ferrite oxygen carrier at a reducing temperature. Within the fuel reactor, the tri-metallic ferrite oxygen carrier interacts with the carbonaceous fuel and generates a reduced carrier.

US2017370573, for example, describes oxygen carrying materials that include a primary active mass, a primary support material, and a secondary support material. The primary active mass including a composition having a metal or metal oxide selected from the group consisting of Fe, Co, Ni, Cu, Mo, Mn, Sn, Ru, Rh, and combinations thereof.

WO2014/155116 describes a particulate transition metal oxide suitable for use in multiple redox cycles as an oxygen-carrying material in a chemical looping combustion process, in which individual particles are coated with an oxide which is substantially inert during the chemical looping combustion process.

WO2018/115344 describes oxygen-carrying solids, the preparation thereof and their use in chemical looping processes. Also a process for preparing these oxygen-carrying solid is described. In this process impregnation of solid particles with active redox mass followed by calcination at a temperature of between 400 and 1400° C. is included.

A disadvantage of the processes described in WO2014/155116 and WO2018/115344 is the risk to agglomeration of the particles of the oxygen carrier material which has an adverse effect on the impregnation of the particles with the oxido-reductive material. Further, these processes comprise two calcination steps, which make the processes energy intensive and therefore expensive.

SUMMARY OF THE INVENTION

An improved process for the preparation of an oxygen carrier for a chemical looping processes has now been developed.

This process for producing an oxygen carrier for a chemical looping process of the present invention is characterised in that it comprises the following steps:
a. Providing a material A comprising at least one first transition metal and/or at least one oxide of the at least one first transition metal, wherein the at least one first transition metal is selected from one or more of chemical element groups 6-11 of the Periodic System, wherein the at least one first transition metal and/or the at least one oxide thereof is optionally supported on a support material,
b. Subjecting material A to a reaction with $H_2$ to cause at least partial reduction of the at least one first transition metal and/or at least one first transition metal oxide to form a reduced material B,
c. Treating reduced material B with a solution of a salt of at least one second transition metal, wherein the at least one second transition metal is selected such that it has a standard reduction potential that is larger than a standard reduction potential of the at least one first transition metal, wherein a portion of the at least one first transition metal in the reduced material B is replaced by the at least one second transition metal, wherein a molar ratio of the at least one first transition metal with respect to the at least one second transition metal in the reduced material B ranges between 2:1 and 100:1, and
d. Washing and optionally drying the thus obtained oxygen carrier.

The oxygen carrier material of the present invention which contains at least one first transition metal and/or at least one transition metal oxide functions as a material which provides oxygen to the chemical looping process and is able to deliver the oxygen contained in it, e.g. its lattice oxygen, to the fuel. The at least one first transition metal oxide can either be a single transition metal oxide or a mixture of two or more different transition metal oxides or a mixed transition metal oxide. Transition metal oxides may differ from each other in the nature of the transition metal contained therein. Additionally or instead thereof, one single transition metal may be present in different oxidation states. Within the scope of this invention a mixture of (1) at least one transition metal as described above and (2) at least one transition metal oxide as described above may be used as well as oxygen carrier material.

When subjecting material A to a reaction with $H_2$ to cause reduction of the at least one first transition metal and/or the at least one first transition metal oxide with the purpose of forming a reduced material B, the reduction reaction with $H_2$ may be carried out in such a way that either a partial or a substantially complete reduction of material A is achieved. Thereby, the second transition metal contained in the solution is selected such that it has a standard reduction potential that is higher than a standard reduction potential of the first transition metal.

The solution of a salt of a second transition metal may be a solution of the salt of the at least one second transition metal in a solvent, wherein the solvent may be an inorganic or organic solvent. Preferably however an aqueous solution of the at least one second transition metal salt is used. Within the scope of this invention, the solution of a salt of at least one second transition metal may be (a) a solution of a single salt of a single second transition metal, (b) a solution of a mixture of two or more different salts of a second transition metal or (c) a solution of the same or different salts of different second transition metals.

In the treatment, the solution of the salt of the at least one second transition metal is advantageously supplied in such an amount that the molar ratio of the first transition metal with respect to the second transition metal in the reduced material B ranges between 2:1 and 100:1. The inventors have observed that within these ranges a virtually complete exchange of the at least one second transition metal for the at least one first transition metal takes place, i.e. the at least one second transition metal is virtually completely incorporated in the reduced material B, and a corresponding amount of the at least one first transition metal is released from the reduced material.

The process of the present invention for producing an oxygen carrier presents the following advantages:

The process of the present invention can be performed in an energy efficient way because the energy consuming step of calcination of the material which in prior art processes is carried out at high temperatures of above 400° C. can be dispensed with. The process of this invention must not contain such a calcination step and instead of the calcination step drying of the oxygen carrier at a significantly lower temperature of maximum 300° C. suffices to achieve anchoring of the second transition metal to the oxygen carrier material.

Loading of the second transition metal onto the oxygen carrier may be easily achieved by treating reduced material B with an excess of the aqueous solution of the salt of the second transition metal. The second transition metal is included in reduced material B during this treatment. Without wanting to be bound by this theory, the inventors assume that an ion exchange occurs between the second transition metal contained in the aqueous solution and the reduced material B, and the drying step ensures anchoring of second transition metal in reduced material B. Moreover, by the use of the aqueous solution maximal loading of the second transition metal to the oxygen carrier may be achieved and any remaining salts can be removed by simply washing the thus obtained oxygen carrier.

The amount of second transition metal loaded onto the oxygen carrier can be controlled, by controlling process parameters in step c., such as, without being limited thereto, the concentration of the second transition metal salt in the solution, the contact time, contact temperature, etc. or a combination of two or more hereof.

The oxygen carrier that may be obtained by the process of the present invention has a sufficiently high mechanical strength, it is capable of partially oxidizing $CH_4$ to CO and $H_2$ and has a surprisingly high (re)activity towards $CH_4$.

It is well-known from the prior art that Cu-oxides are mainly suitable for total oxidation reactions. Cu-oxide materials are well-known for their oxygen uncoupling effect during chemical looping processes. It has now surprisingly been found that, when use is made of the oxygen carrier of this invention, which has been regenerated or re-oxidized utilizing steam-oxidation or in other words wherein the lattice oxygen in the oxygen carrier material has been replenished using steam, the chemical looping process mainly leads to a partial oxidation of $CH_4$.

Although the oxygen carrier of the present invention is suitable for use in many processes as an oxygen supplying material, it is preferably used in a CLR process for the conversion of methane into CO and $H_2$, combined with an oxidation step where steam is converted into $H_2$.

The process of the present invention in particular is a process for the preparation of an oxygen carrier for a chemical looping process. The process of the present invention comprises the steps a-d as described above.

Step a

In step a) of the process of the present invention a material A is provided, comprising at least one first transition metal and/or at least one oxide of the at least one first transition metal.

According to preferred embodiments of the invention, material A may comprise one or two first transition metals, but preferably material A contains one single first transition metal and/or at least one oxide thereof. Materials A considered suitable for use in the method of this invention may comprise one or more of the following:
- one single transition metal in a single oxidation state,
- one single transition metal in two or more different oxidation states,
- two or more different transition metals in a single oxidation state,
- two or more different transition metals, wherein one or more of the transition metals may be present in different oxidation states.

Instead thereof or additionally, material A may comprise one or more of the following:
- a single oxide or two or more different oxides of the at least one first transition metal. Herein, The oxide may contain the at least one first transition metal in one single oxidation state or in two or more different oxidation states.
- a mixture of the at least one first transition metal and at least one oxide of the at least one first transition metal.

It shall be clear to the skilled person that additional combinations of first transition metals and oxides thereof, not listed above, may be suitable for use in the present invention.

The at least one first transition metal can be selected from one or more of chemical element groups 6-11 of the Periodic System, preferably from one or more of chemical element groups 7-11. The Periodic System is here and hereafter defined as the Periodic System of the Elements as described in Wikipedia; https://en.wikipedia.org/wiki/Periodic_table. Chemical element groups 7-11 of the Periodic System contain transition metals, for example manganese (Mn), iron (Fe), ruthenium (Ru), cobalt (Co), rhodium (Rh), nickel (Ni), palladium (Pd), platinum (Pt), copper (Cu), silver (Ag) and gold (Au). In a preferred embodiment of this invention the at least one first transition metal preferably is chosen from the group comprising Fe, Co, Mn, Cu, Ni, Ru and Rh and mixtures of two or more of the afore-mentioned transition metals. In a further preferred embodiment, the at least one first transition metal preferably is chosen from the group comprising Fe and Mn and mixtures hereof.

In a preferred embodiment, the at least one first transition metal and/or at least one oxide thereof in material A may be supported on a support or carrier material. A single support material or two or more different support materials may suitably be used. Alternatively, the one or more support materials may form part of material A.

Within the scope of this invention, a wide variety of support materials may suitably be used. Suitable carrier materials include, without being limited thereto calcium aluminate with formula $CaAl_2O_4$, silica with formula $SiO_2$, titanium oxide with formula $TiO_2$, perovskites with formula $CaTiO_3$ with or without added transition metals, alumina with formula $Al_2O_3$, zirconia with the formula $ZrO_2$ possibly structurally stabilized with elements such as Ca, Mg, Ce or Al, yttrium oxide with formula $Y_2O_3$, barium zirconate with formula $BaZrO_4$, magnesium aluminate with formula $MgAl_2O_4$, cerium oxide with formula $CeO_2$ and lanthanum oxide with formula $La_2O_3$ or a mixture of two or more of these materials. The support material may or may not react with the other elements comprised in material A during pre-treatment resulting in a new mixed phase support material.

Material A can also comprise an ore of a transition metal, for example, an iron ore.

Within the scope of this invention, material A may take different forms or shapes. Material A can, for example be present as a particulate material which will usually have smaller dimensions or a structured material which usually will have a larger dimension. When material A is a structured material it can, for example, be present in the form of beads, spheres, but the material may also be shaped to provide a structure with larger dimensions for example (hollow) cylinders, rods, pellets and more advanced shapes such as monoliths, foams, and 3D-printed materials. When material A is a particulate material, the particles of material A preferably have a particle diameter smaller than 1 mm, more preferably smaller than 500 μm, most preferably between 100 and 300 μm. Particle diameter may be determined using sieving, laser diffraction, optical microscopy or electron microscopy.

Material A can, for example, be obtained by a process as described in WO2018115344, comprising the following steps:
a) Preparing an aqueous suspension comprising an oxide or a mixture of precursor oxides of a support material,
b) spray drying said slurry obtained in step (A) to form particles,
c) calcining the particles resulting from the spray drying in step (B), said calcination being carried out under air and at a temperature between 400° C. and 1400° C.;
d) the optional screening of the calcined particles from step (C),
e) integrating at least one transition metal oxide according to a step e1) or a step e2) to produce material A
  e1) impregnating the particles from step (C) with a precursor compound of the at least one transition metal oxide, and (ii) drying the impregnated particles followed by (iii) calcination;
  e2) incorporation of the at least one transition metal oxide during the preparation of the suspension in step (A).

During preparation of the suspension in step A, a dispersant can be used. Suitable dispersants may be selected by the skilled person, depending on the nature of the particles which are to be stabilized in the suspension.

Step b)

In step b) of the process of the present invention, material A is subjected to a reduction reaction with $H_2$ to cause reduction of the at least one first transition metal and/or at least one oxide thereof, to form a reduced material B. Thereby, reduction may involve a partial reduction or it may be continued until a substantially complete reduction of the at least one first transition metal and/or oxide thereof is achieved.

The reduction reaction may be carried out at any temperature considered suitable by the skilled person, but is preferably performed at a raised temperature, preferably a temperature of at least 200° C., more preferably a temperature above 500° C. The temperature during the reduction reaction will generally be below 1000° C., more preferably below 900° C. The skilled person will be capable of selecting the appropriate temperature to achieve a desired degree of reduction.

In general, the reduction time will be less than 24 hours, preferably less than 20 hours, more preferably less than 15 hours. The skilled person will be capable of selecting the appropriate time to achieve a desired degree of reduction.

Reduction of the at least one first transition metal is generally performed in the presence of $H_2$. $H_2$ can be present in a mixed gas stream comprising, apart from $H_2$, an inert gas, such as helium (He) or Argon (Ar) or nitrogen ($N_2$). Preferably, at least 10 vol. % $H_2$ is present in the mixed gas stream, more preferably at least 20 vol. % $H_2$.

During the reduction reaction of material A a reduced material B is formed. Thereby, an oxidation state of the at least one first transition metal is reduced. The extent to which the at least one first transition metal and/or the at least one first transition metal oxide in material A is reduced may be selected by the skilled person depending a.o. on the nature of the at least one first transition metal and/or the at least one first transition metal oxide and the targeted properties for reduced material B.

Step c)

In step c) of the process of the present invention reduced material B is treated with a solution of a salt of at least one second transition metal, wherein the at least one second transition metal is selected such that it has a standard reduction potential that is larger than a standard reduction potential of the at least one first transition metal in material B. A list of standard reduction potentials of transition metals can, for example, be found, for example, via http://wwwchem.uwimona.edu.jm/courses/TMredox.html or http://www.wissensdrang.com/auf1rp.htm.

The salt of the at least one second transition metal is preferably selected from salts of one or more transition metals of the group comprising Cu, Co, Ni, Ru or Rh or a mixture of two or more hereof, more preferably the at least one second transition metal is selected from group comprising of Cu, Co and Ni, or a mixture of two or more hereof, most preferably the salt of the at least one second transition metal is a Cu(II) salt. The salt of the at least one second transition metal is preferably an inorganic salt. The salt of the at least one second transition metal is preferably a halide salt, more preferably a chloride salt. Particularly preferred is Cu-chloride, more preferably Cu(II)-chloride.

The temperature at which reduced material B is treated with an aqueous solution of a salt of the at least one second transition metal is not critical to the invention and can be carried out in a wide temperature range. Preferably, however the treatment of reduced material B with an aqueous solution of the second transition metal salt is performed at room temperature, as at room temperature a sufficiently high exchange ratio may be achieved. The time of the treatment may also vary within wide ranges, depending on the exchange ratio envisaged and the nature of the at least one first and at least one second transition metal. The treatment time may for example be short, preferably shorter than 1 hour, more preferably shorter than 30 min, most preferably shorter than 10 min, typically between 1 and 5 min. The inventors have observed that exchange of the at least one first transition metal of reduced material B by the at least one second transition metal readily takes place upon contact of reduced material B with the aqueous solution of the second transition metal salt. The inventors have further observed that within the ranges disclosed in the claims, a complete or almost complete exchange or incorporation of the at least one second transition metal may take place.

Without being bound to the theory, it is believed that during the treatment of reduced material B ions of the at least one first transition metal in reduced material B are exchanged by ions of the at least one second transition metal. The amount of ions of the at least one first transition metal that are exchanged by ions of the at least one second transition metal may depend on several parameters, a.o. the nature of the at least one first and at least one second transition metal, the concentration of the salt of the at least one second transition metal in the aqueous solution, the treatment time and temperature. By varying one or more of the afore-mentioned parameters, the amount of the at least one second transition metal incorporated in and/or on reduced material B and thus also the properties and reactivity of the oxygen carrier may be amended.

The exchange of ions of the at least one first transition metal in reduced material B by ions of the at least one second transition metal in reduced material B predominantly takes place at the surface of reduced material B, whereas ion exchange in the bulk of reduced material B remains limited. In fact incorporation of the at least one second transition metal may additionally take the form of protrusions or flakes, present on the surface of the oxygen carrier. The porosity of the reduced material B may change following the ion exchange, but changes will generally remain limited. In fact, the porosity of reduced material B is often raised during step c). This is in contrast with impregnation according to the state of the art, where porosity of a material is often reduced.

Many techniques known to the skilled person may be used to treat reduced material B with the salt of the at least one second transition metal. A solution of a salt of the at least one second transition metal in a solvent may be used for the treatment of the reduced material B. Although the use of organic solvents is not explicitly excluded, preferably use is made of an aqueous solution of a salt of the at least one second transition metal for the treatment of the reduced material B. Reduced material B may for example be submerged in the aqueous solution, it may be sprayed, impregnated or injected with the aqueous solution or any other technique considered suitable by the skilled person may be used. Preferably, the aqueous solution comprising reduced material B is agitated to promote the uniform exchange of ions.

An aqueous solution of a salt of the at least one second transition metal can comprise suitable additives. The additives may, for example, slow down the release of the at least one second transition metal to achieve a deeper penetration of the at least one second transition metal in the pores of reduced material B. Examples of additives include complexing agents, surfactants and pH buffers.

The amount of the at least one second transition metal loaded onto the oxygen carrier can be controlled, by controlling process parameters in step c), such as, without being limited thereto, the concentration of the at least one second transition metal salt in the solution, the contact time, contact temperature, etc. or a combination of two or more hereof. The inventors have namely observed that depending on the concentration, contact time and temperature, either virtually all or part of the at least one second transition metal may be incorporated into the oxygen carrier and exchange for the at least one first transition metal. Without wanting to be bound by this theory, the inventors believe that exchange of the at least one first transition metal ion for the at least one second transition metal mainly takes place on the accessible surface of the oxygen carrier material, including the external surface and the surface provided by the pores of the oxygen carrier. As soon as the amount of the at least one second transition metal is higher than the amount of the at least one first transition metal present on the accessible surface of the oxygen carrier, part of the second transition metal may be able to diffuse into the oxygen carrier material and be exchanged for first transition metal there, and/or part of the at least one second transition metal may remain in solution and precipitate in the pores or on the surface of the oxygen carrier upon drying.

In the oxygen carrier of the present invention the molar ratio between the at least one first transition metal and the at least one second transition metal in the reduced material B is between 2:1 and 100:1, preferably between 3:1 and 95:1, more preferably between 5:1 and 90:1.

Step d)

In step d) of the process of the present invention the obtained oxygen carrier is washed. Optionally the oxygen carrier may be dried, but it may also be used in a chemical looping process in a non or partially dried state. Washing is performed with a washing solution, to at least partially remove remaining free ions, including ions of the at least one first transition metal that have been released from material B, ions of the at least one second transition metal salt which did not undergo an ion exchange reaction with transition metal ions of reduced material B but remained on the reduced material B, and counter ions contained in the at least one second transition metal salt. Within the scope of this invention many washing solutions may be used, as long as they have a boiling point that is not too high so that the drying temperature can be kept within reasonable ranges and as long as they do not undesirably interact with the oxygen carrier material or give rise to the deposition of unwanted side products on the oxygen carrier material. Therefore, washing can be performed with water, preferably an excess of deionised water. The obtained oxygen carrier can be washed once or several times.

Drying is performed to remove remaining washing solution, for example, remaining water from the obtained oxygen carrier. The temperature of drying preferably is below 300° C., more preferably below 250° C., most preferably below 200° C. The temperature of drying is preferably above 20° C., more preferably above 30° C., most preferably above 40° C. Usually drying is carried out in air, but if so desired, drying may be carried out in the presence of an inert gas or in vacuum.

The obtained oxygen carrier will generally comprise the at least one first transition metal and a lower amount of the at least one second transition metal. The obtained oxygen carrier preferably comprises between 20 and 70 wt. % of the at least one first transition metal, based on the total weight of the oxygen carrier. In the obtained oxygen carrier, the molar ratio between the at least one first and the at least one second transition metal will usually be between 2:1 and 100:1, preferably between 3:1 and 95:1, more preferably between 5:1 and 90:1.

Oxygen Carrier

The invention is also directed to the oxygen carrier obtained by the process according to the invention, as described herein.

According to a preferred embodiment the oxygen carrier comprises Fe and/or Mn as the at least one first transition metal. According to a further preferred embodiment, this oxygen carrier can be regenerated by contacting it with $H_2O$ (steam), for example in a CLR process and is suitable for $H_2$ production during this regeneration. Preferably, the oxygen carrier of the present invention comprises between 20 and 70 wt % of Fe, Mn or a mixture thereof, based on the total weight of the oxygen carrier material. Regeneration of the oxygen carrier can be carried out within a broad temperature range, for example between 600° C. and 1000° C., preferably between 800° C. and 950° C. If so desired, temperatures below 600° C. may be used, but this will slow down the regeneration process.

According to another preferred embodiment the oxygen carrier comprises Cu as the at least one second transition metal. The presence of Cu in the oxygen carrier raises the activity of an oxygen carrier for methane conversion into hydrogen and CO in a CLR process. Preferably, the oxygen carrier of the present invention comprises between 0.05 and 7.5 wt % of Cu, based on the total weight of the oxygen carrier. When the oxygen carrier is a particulate material Cu will usually be mainly present on the surface of the particles. Higher Cu concentrations increase the risk to the occurrence of Cu agglomeration on the surface of the oxygen carrier. High Cu concentrations on the surface of the oxygen carrier is not beneficial in the chemical looping process as Cu is known to act as a catalyst for syngas production in combination with the oxides of the first transition metal present in the oxygen carrier. An excessive amount of Cu in the oxygen carrier will therefore not improve the operation of a chemical looping process and risks to cause unwanted and increased deposition of carbon on the oxygen carrier surface.

According to a preferred embodiment the oxygen carrier of this invention comprises between 10-70 wt. %, preferably between 20 and 70 wt % of Fe, Mn or a mixture thereof and between 0.05 and 7.5 wt % of Cu, based on the total weight of the oxygen carrier. This oxygen carrier is very suitable for the partial oxidation of methane into syngas (CO and $H_2$) in a CLR process when the oxygen carrier is regenerated by $H_2O$.

Use

The invention is further directed to the use of an oxygen carrier obtained by the process of the present invention or an oxygen carrier as described above in a chemical looping reforming (CLR) process. The oxygen carrier that may be obtained by the process of the present invention is very suitable for a CLR process wherein methane is converted into CO and $H_2$. The oxygen carrier that may be obtained by the process of the present invention can be regenerated by contacting the oxygen carrier with steam in the regeneration process for the oxygen carrier in the CLR process. During the regeneration process also $H_2$ is generated. The steam during the regeneration process can be diluted with an inert gas, such as nitrogen, argon and/or helium.

The invention is further directed to a process for the regeneration of the oxygen carrier of the present invention, wherein the oxygen carrier is regenerated by $H_2O$, preferably steam. During the regeneration of the oxygen carrier of the invention in a chemical looping process with stream the activity of oxygen carrier remains high.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

BRIEF DESCRIPTION OF THE FIGURES

The invention will now be explained by way of the following examples without however being limited thereto.

DESCRIPTION OF EMBODIMENTS

Materials Preparation

Figure 1:
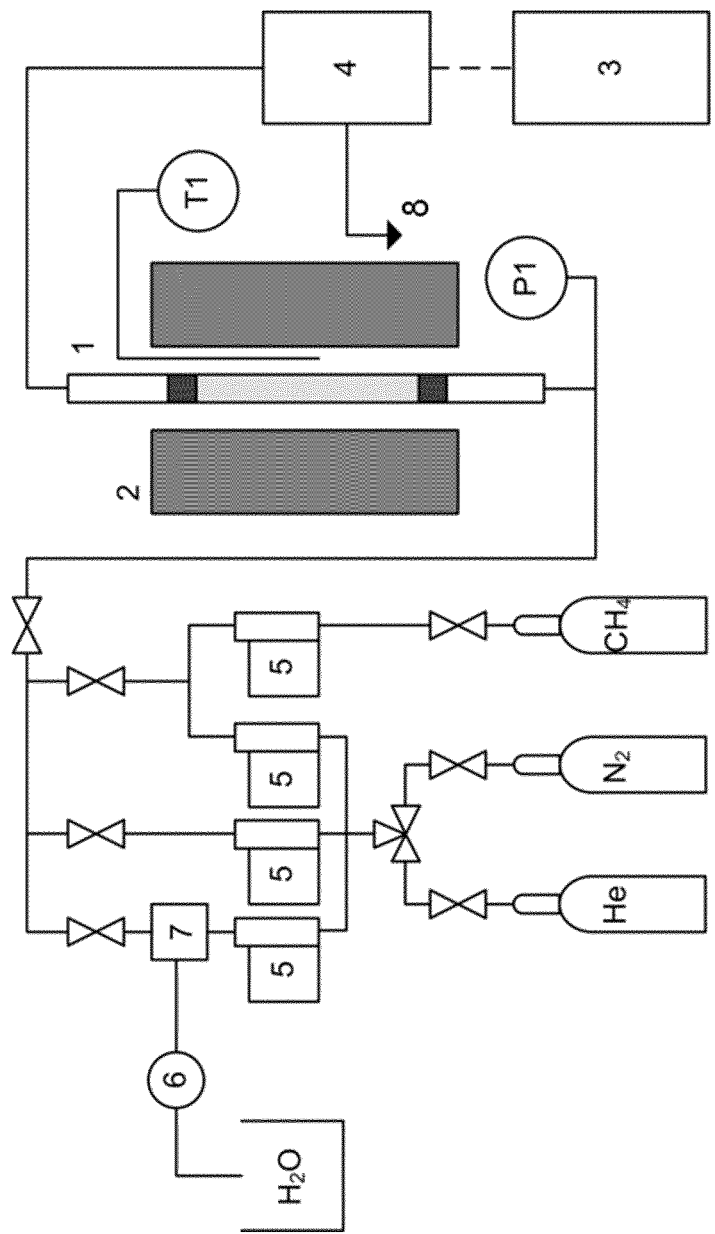
FIG. 1 shows a view to a small scale reactor, wherein the following reference numerals are used:
1. Reactor
2. Furnace
3. Computer
4. Mass spectrometer
5. Mass flow controller
6. HPLC pump
7. Vaporizer
8. Vent.
Figure 2A:
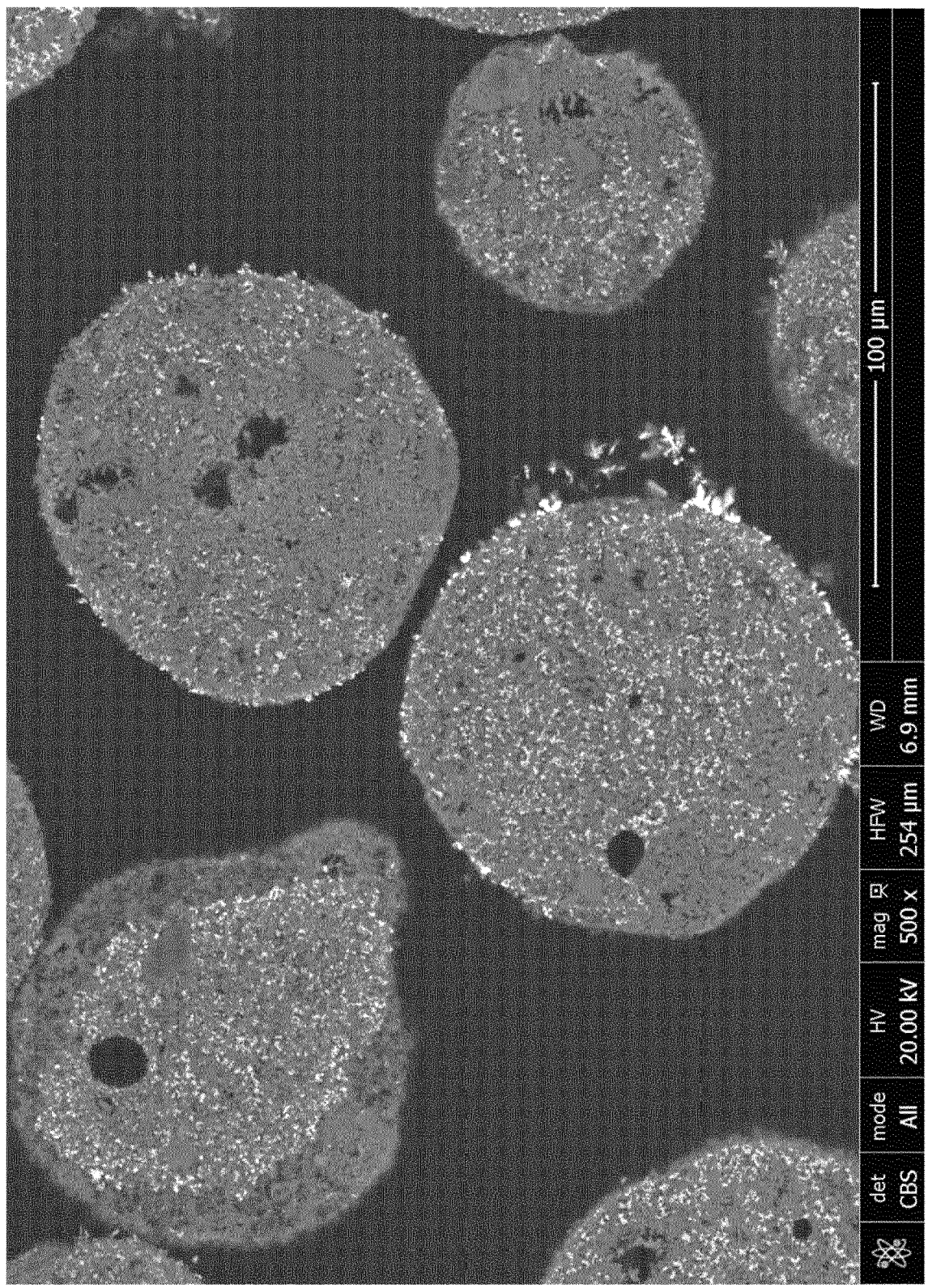
FIGS. 2A-B represent SEM-EDS images of the oxygen carrier material of example 1, 0.013 g Cu deposited on SPRV9_4 pre-reduced at 850° C., as a result of which a final ratio Fe:Cu of 36.1:1 was obtained.
Figure 2B:
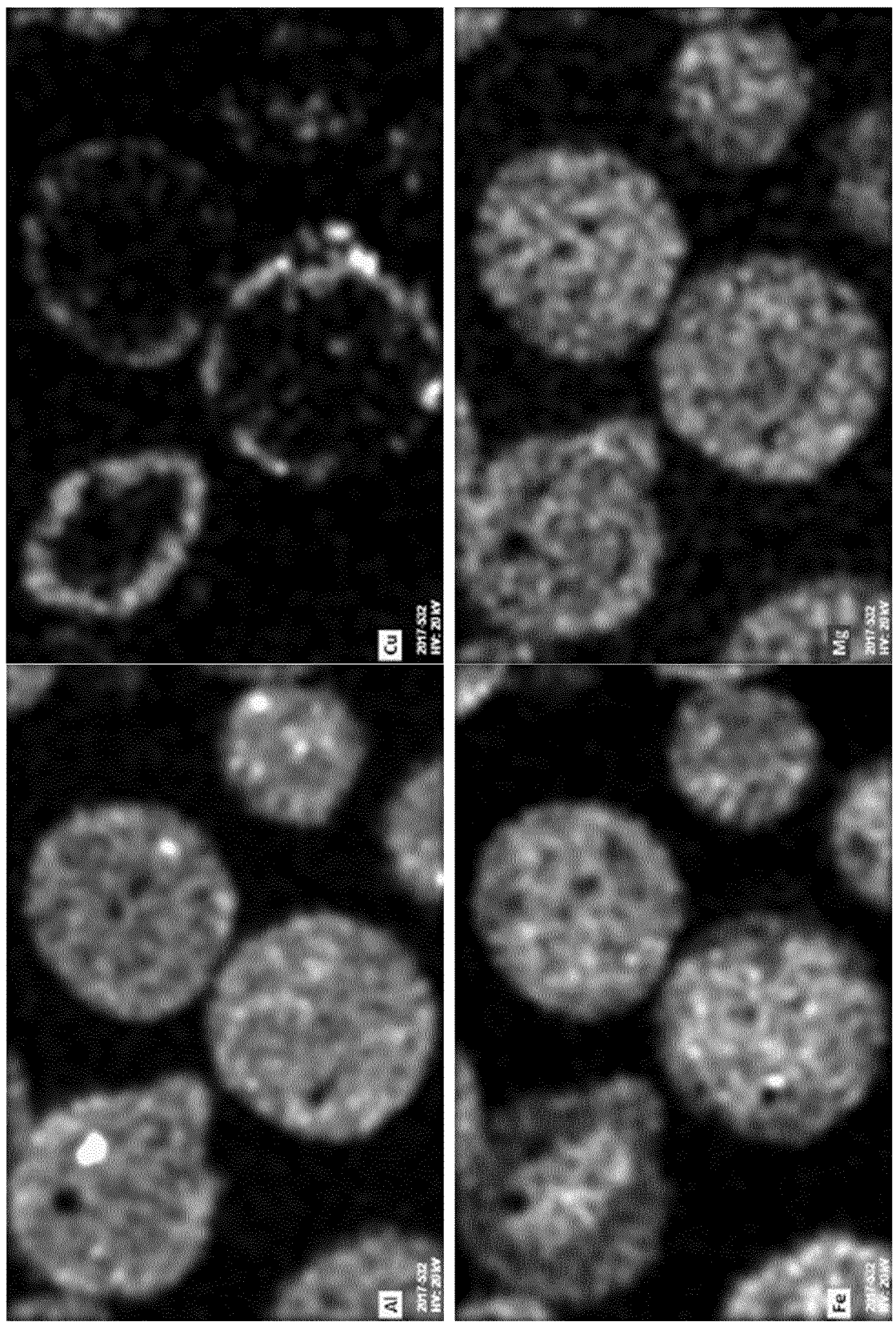
Figure 3A:
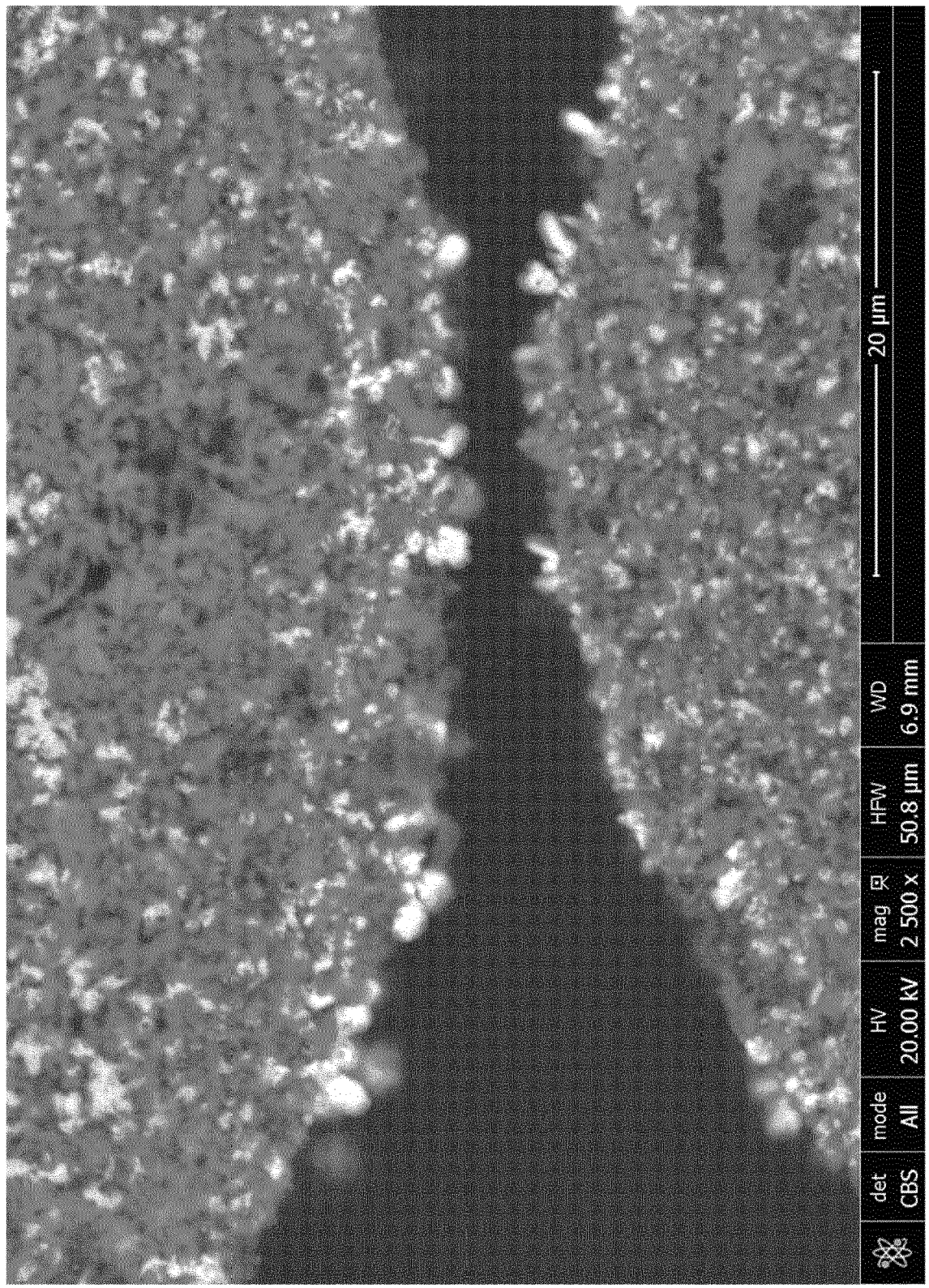
FIGS. 3A-B represent enlarged views of FIGS. 2A-B, with SEM-EDS of the oxygen carrier material of example 1, 0.013 g Cu deposited on SPRV9_4 pre-reduced at 850° C., as a result of which a final ratio Fe:Cu of 36.1:1 was obtained).
Figure 3B:
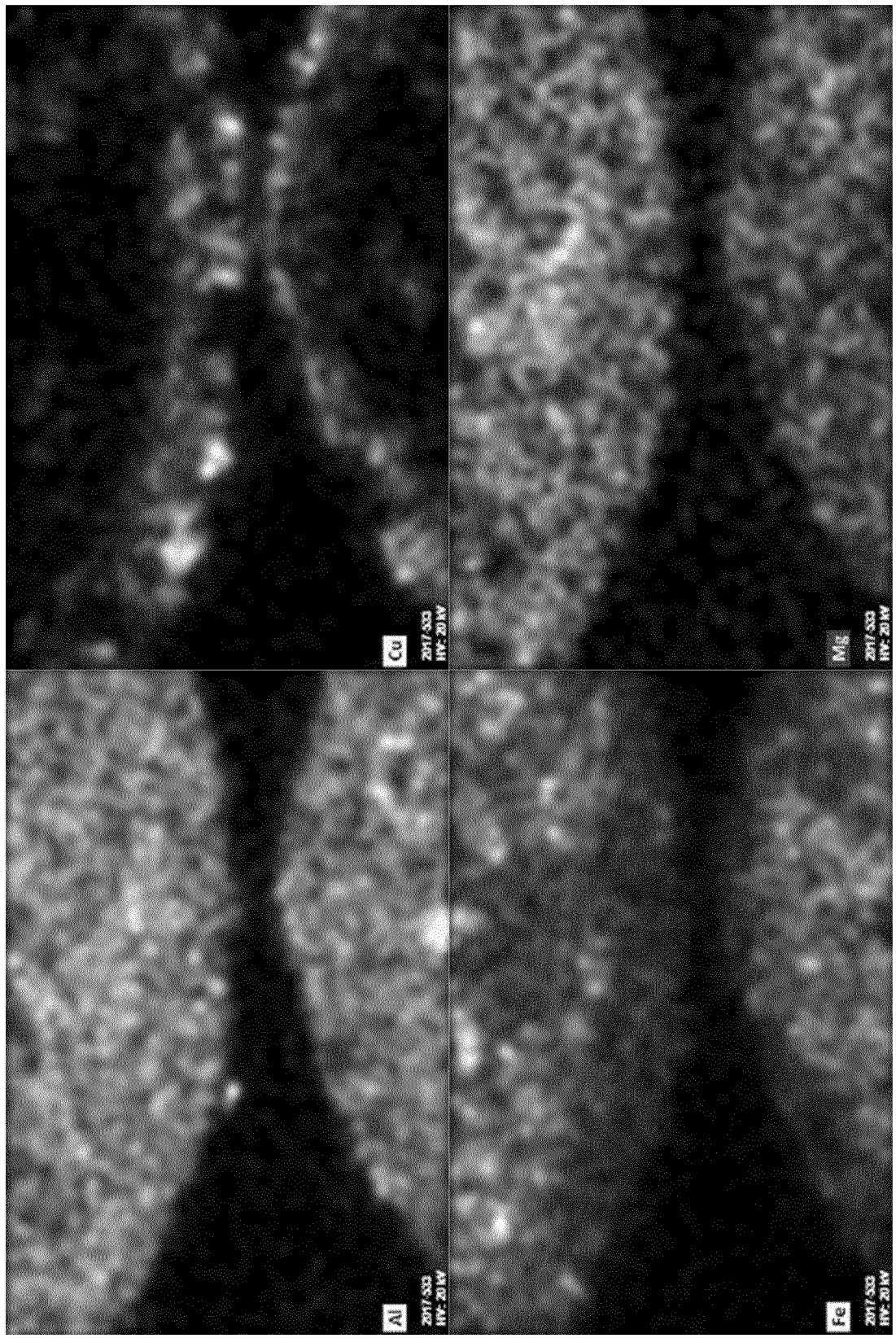
Figure 4A:
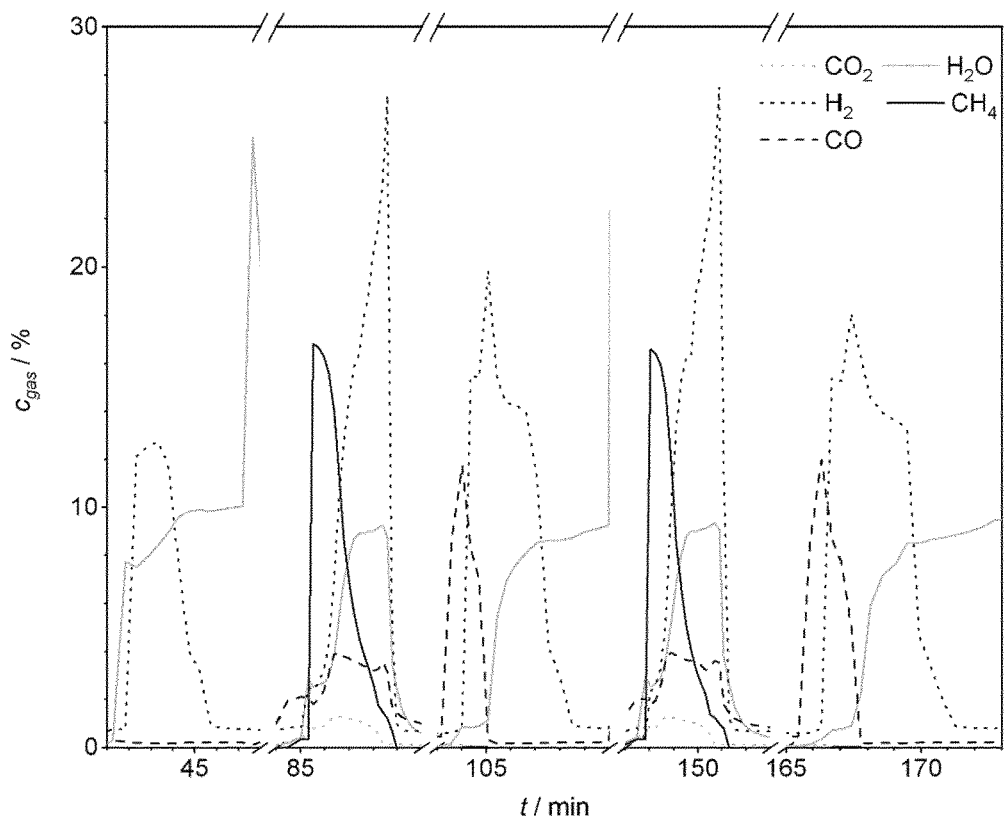
FIGS. 4A and C represent reactor test results on 0.25 g of the oxygen carrier material obtained in example 3, FIGS. 4B and D represent reactor test results on 0.25 g of the oxygen carrier material obtained in example 2.
Figure 4B:
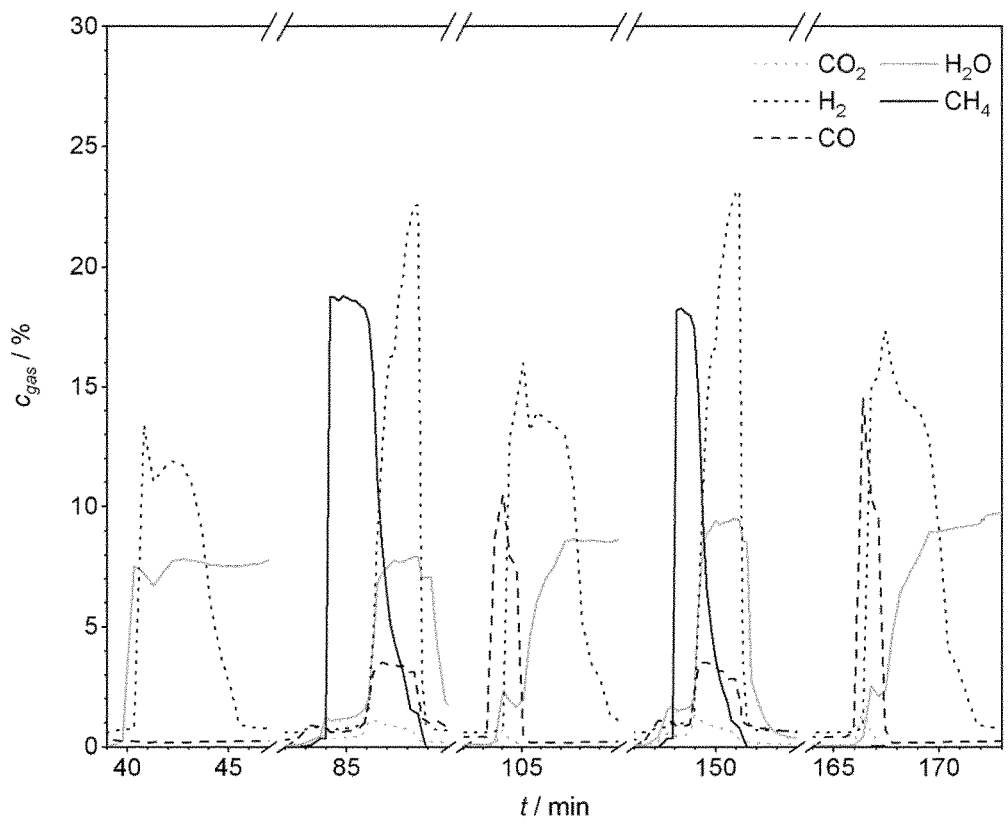
Figure 4C:
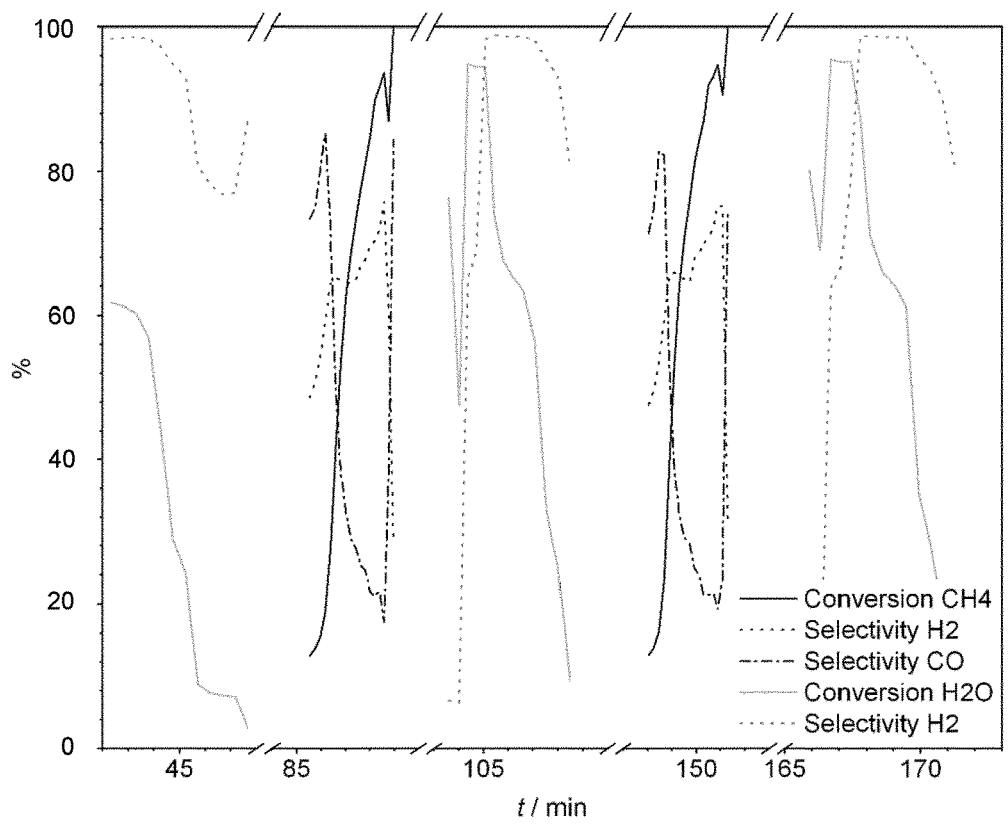
Figure 4D:
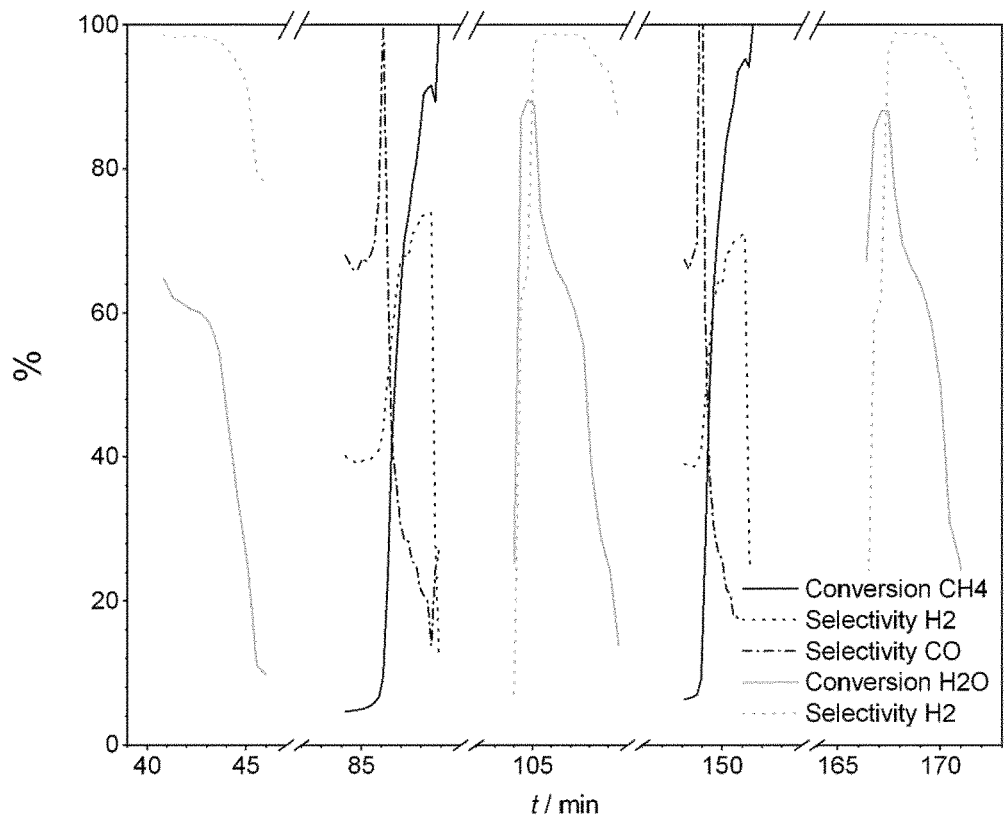
Figure 5A:
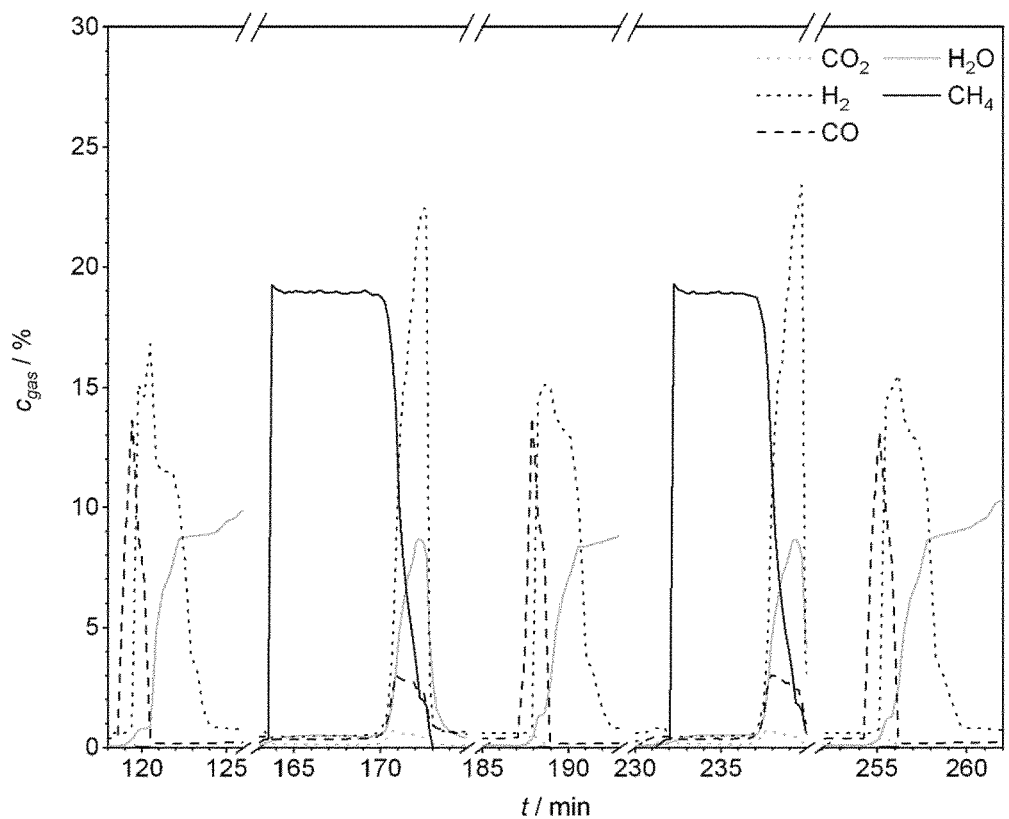
FIG. 5A-B represent reactor test results on 0.25 g of SPRV9_4 oxygen carrier material after it had been subjected to pre-reduction, and before being contacted with the $Cu^{2+}$ solution.
Figure 5B:
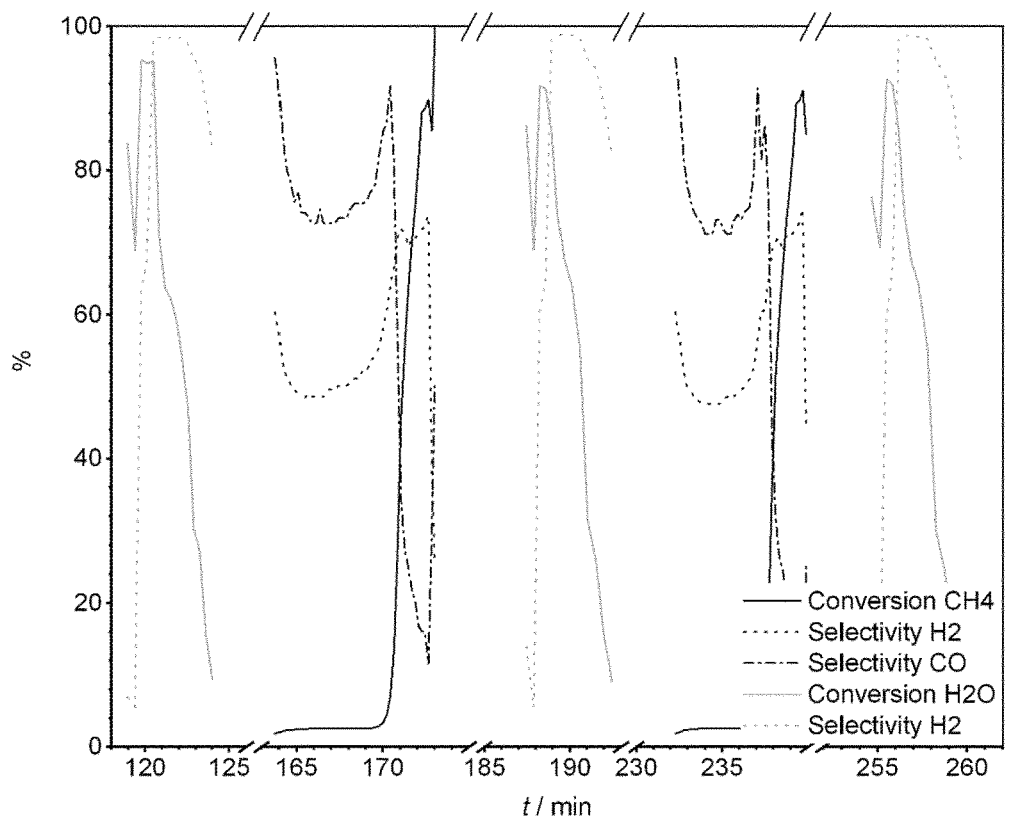

The Cu-modified oxygen carrier was synthesized by a spray drying method combined with a post treatment. Briefly, 60-70 wt. % α-$Fe_2O_3$ (Alfa Aesar, 98% (metals basis), −325 mesh powder), 8.5-11.3 wt. % MgO (MAF Magnesite, MagChem 30) and 21.5-28.7 wt. % α-$Al_2O_3$ (Almatis, CT3000SG) particles (molar ratio MgO/$Al_2O_3$ of 1/1) were dispersed in de-ionized water with the necessary dispersants (Darvan C (T Vanderbilt, USA), or Dolapix, types A88, PC75 and PC80 (Zschimmer & Schwarz, Germany)). These suspensions were homogenized by milling in a planetary ball mill (Retsch, Pulverisette 5, Germany). After adding a suitable polymeric binder(polyethyleneoxide PEO, type PEO-1Z (Sumitomo Seika, Japan), and/or polyvinyl-alcohol, PVA 15000 (Fluka, Switzerland), and/or polyethyleneglycol, PEG 6000 (Merck-Schuchardt, Germany)), the suspension was spray-dried. The chamber fraction collected underneath the cone was then sieved to obtain particles of suitable dimensions for an industrial chemical looping process inside an interconnected fluidized bed process.

These particles were then calcined at 500° C. for 1 hour in air and afterwards a sintering procedure was performed in air at 1175° C. using a high temperature furnace (Bouvier, Belgium) to obtain oxygen carrier particles with sufficient mechanical properties. The $Fe_2O_3$-phase was then reduced completely to Fe by a mixture of 20% $H_2$/He at 650-900° C.

The Cu phase was then deposited on the oxygen carriers by a modified incipient wetness impregnation method wherein $CuCl_2$-solution with concentrations varying from 0.28 mol/l to 5.4 mol/l were made and used to fill the pores of the oxygen carrier material. As a result, part of the available metallic Fe is replaced by Cu by a spontaneous and quantitative redox reaction: $Fe+Cu^{2+} \rightarrow Fe^{2+}+Cu$. After having been contacted with the Cu solution for two minutes, the oxygen carriers were washed several times by an excess of deionized water in order to remove remaining free ions and then dried at moderate temperatures (50-120° C.). After sufficient drying, the Cu-modified oxygen carriers were characterized and used during reactor tests.

Specific Preparation Concentrations and Weights:

EXAMPLE 1

A pre-reduced oxygen carrier material was obtained by reducing an oxygen carrier material overnight in a 20 vol. % $H_2$ in He gas flow, 100 sccm, at a temperature of 850° C.

0.76 g $CuCl_2.2H_2O$ was dissolved in 1.1 ml $H_2O$, so that a 4.05 M $Cu^{2+}$-solution was obtained. 0.050 g of this solution was contacted with 0.5072 g of pre-reduced oxygen carrier (OC) material. In case of a quantitative reaction, 0.013 g Cu (s) can be deposited. The final molar ratio Fe:Cu observed was 36.1:1.

EXAMPLE 2

0.0241 g $CuCl_2.2H_2O$ were dissolved in 0.4993 g $H_2O$, so that a 0.283 M $Cu^{2+}$-solution was obtained.

0.30 g of this solution was contacted with 1 g of pre-reduced oxygen carrier material, obtained by overnight reduction in 20 vol. % $H_2$ in He, 100 sccm, at a temperature of 900° C. In case of a quantitative reaction 0.0054 g Cu (s) can be deposited. It was observed that the molar ratio Fe:Cu in the obtained end product was 87:1.

EXAMPLE 3

0.4614 g $CuCl_2.2H_2O$ were dissolved in 0.5058 g $H_2O$, so that a 5.35 M solution in $H_2O$ was obtained. 0.30 g of this solution was contacted with 1 g of pre-reduced oxygen carrier material overnight, obtained by reduction of the oxygen carrier material in the presence of a 20 vol. % $H_2$ flow in He, 100 sccm, at a temperature of 900° C.

In case of a quantitative reaction, 0.102 g Cu (s) can be deposited on the oxygen carrier material. The final molar ratio Fe:Cu obtained was 3.7:1

SEM & Optical Microscopy

The microstructure of the oxygen carriers was investigated by optical microscopy (SteREO Imager, ZEISS) and by scanning electron microscopy using a FEI NOVA Nanosem 450 with an energy dispersive spectroscopy (EDS) system on polished cross-sections of embedded particles inside an epoxy resin.

Reactor Tests

FIG. 1 shows a small lab-scale reactor used for investigating the reduction and oxidation reactions of the oxygen carriers. Calibrated mass flow controllers introduced a total flow of 100 sccm of inert and reacting gases in the reactor where a packed bed of 0.25 g of the OC material was inserted in the quartz reactor tube of 6 mm internal diameter. During the methane step, the oxygen carriers were reduced by 20 sccm methane and during the oxidation phase steam was generated in a heated vaporizer from where inert gases such as nitrogen and helium transport 0.020 ml/min vaporized water which was introduced in the vaporizer by a high performance liquid chromatography (HPLC) pump. The experiments were conducted at a temperature of 900° C., which was measured by a thermocouple outside but in close contact with the reactor tube. The composition of the gases exiting the reactor was measured using mass spectrometry.

Results

The results shown in FIGS. 4A-D and 5A-B were obtained by using the following formulas:

$$\text{Selectivity}_{CO} = S_{CO} = \frac{n_{CO,produced}}{n_{CH_4,converted}} = \frac{n_{CO,(1)}}{\frac{1}{2}(n_{H_2,tot} + n_{H_2O,(3)})}$$

$$\text{Selectivity}_{H_2} = S_{H_2} = \frac{\frac{1}{2}(n_{H_2,produced})}{n_{CH_4,converted}} = \frac{n_{H_2,tot}}{n_{H_2,tot} + n_{H_2O,(3)}}$$

$$C_{CH_4} = \frac{\frac{1}{2}(n_{H_2,tot} + n_{H_2O,(3)})}{n_{CH_4,out} + \frac{1}{2}(n_{H_2,tot} + n_{H_2O,(3)})}$$

$$C_{H_2O} = n_{H2}/(n_{H2O} + n_{H2})$$

$$S_{H2} = n_{H2}/(n_{H2} + n_{CO})$$

TABLE 1

| Molar ratio Fe:Cu | 1:0 | 87:1 | 3.7:1 | 10:1 |
|---|---|---|---|---|
| Crushing strength | 1.46N | | | 1.10N |
| Attrition resistance, modified method | 0.2%/h | | | 4.2%/h |
| Highest oxidation state by steam | $Fe_3O_4$ | $Fe_3O_4$ | $Fe_3O_4$ | $Fe_3O_4$ |
| Lowest oxidation state by $CH_4$ | $Fe/Fe_3C$ | $Fe/Fe_3C$ | $Fe/Fe_3C$ | $Fe/Fe_3C$ |
| Time needed for converting $Fe_3O_4 \rightarrow Fe$[a] | 9 min | 4.5 min | 3.5 min | |
| Time before conversion during reduction >50%[a] | 7.75 min | 3 min | 1.5 min | |
| Reactivity with $CH_4$[a] | | improved | improved | improved |
| Average selectivity towards $H_2$ production when conversion $CH_4$ >50%[a] | 64.2% | 65.1% | 65.1% | |
| Time needed for converting $Fe \rightarrow Fe_3O_4$[a] | 5-6 min | 5-6 min | 5-6 min | |
| Reactivity with $H_2O$[a] | No differences observed | No differences observed | No differences observed | No differences observed |
| $H_2$-selectivity during oxidation[a] | 76.5% | 84.6% | 77.1% | |

[a]during packed-bed testing

The invention claimed is:

1. A process for preparation of an oxygen carrier for a chemical looping process, the process comprising the following steps:
    providing a material A comprising one or more of: at least one first transition metal and/or an oxide of the at least one first transition metal, wherein the at least one first transition metal is selected from one or more of chemical element groups 6-11 of the Periodic System,
    subjecting material A to a reaction with H2 to cause at least partial reduction of the one or more of the at least one first transition metal and/or the oxide of the at least one first transition metal to form a reduced material B,
    treating reduced material B with a solution of a salt of at least one second transition metal to obtain the oxygen carrier, wherein the at least one second transition metal is selected such that the at one second transition metal has a standard reduction potential that is larger than a standard reduction potential of the first transition metal, wherein a portion of the at least one first transition metal in the reduced material B is replaced by the at least one second transition metal, wherein a molar ratio of the at least one first transition metal with respect to the at least one second transition metal in the reduced material B ranges between 2:1 and 100:1, and
    washing the oxygen carrier.

2. The process according to claim 1, wherein the at least one first transition metal is chosen from one or more of chemical element groups 7-11.

3. The process according to claim 1, wherein the salt of the at least one second transition metal is selected from salts of one or more transition metals of the group comprising Cu, Co, Ni, Ru, Rh and a mixture of two or more hereof.

4. The process according to claim 3, wherein the salt of the second transition metal is a Cu (II) salt.

5. The process according to claim 1, wherein the salt of the at least one second transition metal is a halide salt.

6. The process according to claim 5, wherein the salt of the at least one second transition metal is a chloride salt.

7. The process according to claim 1, wherein the solution of the at least one second transition metal salt is an aqueous solution of the at least one second transition metal salt.

8. The process according to claim 1, wherein the oxygen carrier comprises between 10.0 and 70.0 wt. % of the at least one first transition metal, based on a total weight of the oxygen carrier.

9. The process according to claim 1, wherein the molar ratio between the at least one first transition metal and the at least one second transition metal is between 3:1 and 95:1.

10. The process according to claim 1, wherein the reaction with H2 is performed at a temperature of at least 200° C.

11. The process according to claim 1, further comprising drying the oxygen carrier at a temperature of 300° C. or lower.

12. An oxygen carrier obtained by the process according claim 1.

13. The oxygen carrier according to claim 12, comprising between 10.0 and 70.0 wt. % of Fe, Mn or a mixture thereof and between 0.05 and 7.5 wt. % of Cu, based on a total weight of the oxygen carrier.

14. The oxygen carrier according to claim 13, comprising between 20.0 wt. % and 70.0 wt. % Fe, Mn or a mixture thereof.

15. A process for the regeneration of an oxygen carrier according to claim 12, wherein the oxygen carrier is regenerated by contacting the oxygen carrier with steam.

16. The process according to claim 1, comprising utilizing the oxygen carrier in a chemical looping process.

17. The process according to claim 16, wherein the oxygen carrier is regenerated by contacting the oxygen carrier with steam.

18. The process according to claim 1, wherein the one or more of the at least one first transition metal and the oxide of the at least one first transition metal is supported on one or more support materials.

19. The process according to claim 1, wherein the at least one first transition metal is chosen from one or more of: Fe, Co, Mn, Cu, Ni, Ru, Rh and a mixture of two or more thereof.

* * * * *